B. FORD & J. L. PHILLIPS.
ELECTRIC STORAGE BATTERY.
APPLICATION FILED NOV. 22, 1909.

1,151,453.

Patented Aug. 24, 1915.

WITNESSES:
Rob R Ketchel
Frank E. French

INVENTORS
Joseph L. Phillips &
Bruce Ford
BY
Augustus B. Stoughton
ATTORNEY.

UNITED STATES PATENT OFFICE.

BRUCE FORD, OF PHILADELPHIA, AND JOSEPH L. PHILLIPS, OF HAVERFORD, PENNSYLVANIA.

ELECTRIC STORAGE BATTERY.

1,151,453. Specification of Letters Patent. Patented Aug. 24, 1915.

Application filed November 22, 1909. Serial No. 529,429.

*To all whom it may concern:*

Be it known that we, BRUCE FORD, a citizen of the United States, residing at the city of Philadelphia, in the county of Philadelphia and State of Pennsylvania, and JOSEPH L. PHILLIPS, a citizen of the United States, residing at Haverford, Montgomery county, and State of Pennsylvania, have jointly invented certain new and useful Improvements in Electric Storage Batteries, of which the following is a specification.

The invention relates to improvements in storage batteries, more especially of the portable type such as is used for sparking batteries, and its principal object is to prevent any possibility of the acid creeping up and working over the top of the battery.

The invention will be claimed at the end hereof but will first be described in connection with the embodiment of it chosen for illustration in the accompanying drawings in which—

Figure 1:
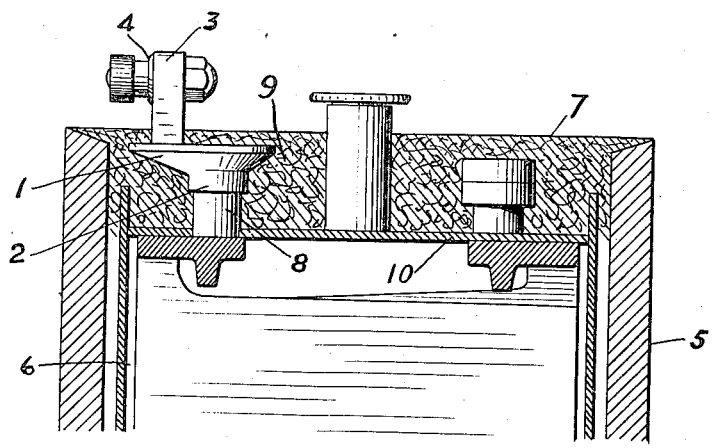
Figure 2:
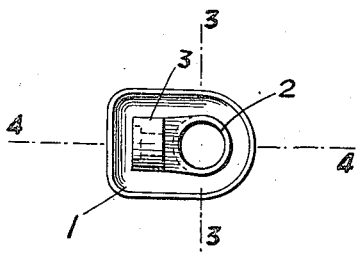
Figure 3:
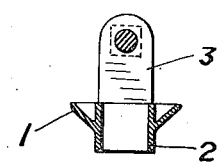
Figure 4:
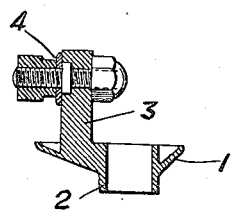
Figure 5:
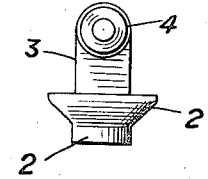

Figure 1, is a sectional view of parts of a storage battery including a terminal post embodying features of the invention. Fig. 2, is a top or plan view of the terminal post. Fig. 3, is a sectional view taken on the line 3—3, of Fig. 2. Fig. 4, is a sectional view taken on the line 4—4, of Fig. 2, showing also binding post attachments, and Fig. 5, is an end view of the terminal post looking from left to right in Fig. 2.

In the drawings 1, is a plate portion which may be concave and it constitutes a flange.

2 is a tubular member carried by the plate portion 1, and extending through and above and below the same.

3, is a standard carried by and rising from the plate portion and arranged to one side of or eccentrically in respect to the tubular member. The plate portion 1, is shown to be longer than it is wide but its form may be varied. The standard is fitted with binding connections 4, the form and construction of which may be varied.

5, is a box in which cells 6, are assembled, and the intermediate connections 7, are provided from cell to cell. The described terminal post is placed over the pillar 8, of the outside cell and the whole top is flooded with sealing compound 9 arranged above a cover 10 of the jar. The flange 1, on the terminal post forms an anchor for the sealing compound 9, and also opposes a long path to any capillary action and thus prevents any possibility of acid creeping up and working over the top of the battery. Since the terminal post is separate from the rest of the connections, it follows that the terminal-pillars can be all made alike and the terminal post applied which is obviously advantageous.

What we claim is:

1. A storage battery terminal post having at one end binding connections and at the other end a terminal-pillar socket and having intermediate of its ends an inverted petticoat which encircles it and constitutes an anchor flange, substantially as described.

2. A storage battery terminal post consisting of a concave plate portion, a tubular member carried by the plate portion and extending through and above and below the same, and a standard carried by and rising from the plate portion and arranged to one side of the tubular member, substantially as described.

3. A storage battery terminal post consisting of a plate portion, a tubular member carried by the plate portion and extending through and above and below the same, and a standard carried by and rising from the plate portion and arranged to one side of the tubular member, substantially as described.

In testimony whereof we have hereunto signed our names.

BRUCE FORD.
JOSEPH L. PHILLIPS.

Witnesses:
GEO. M. HOWARD,
EDGAR L. LONGAKER.